(12) United States Patent
Johnson

(10) Patent No.: US 7,369,572 B1
(45) Date of Patent: May 6, 2008

(54) QUALITY MANAGEMENT FOR A PACKET COMMUNICATION SYSTEM

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 684 days.

(21) Appl. No.: 11/004,132

(22) Filed: Dec. 3, 2004

(51) Int. Cl.
*H04J 3/16* (2006.01)

(52) U.S. Cl. .................. 370/466; 370/465; 370/419

(58) Field of Classification Search .............. None
See application file for complete search history.

(56) References Cited

U.S. PATENT DOCUMENTS 6,731,649 B1 * 5/2004 Silverman ............... 370/466
7,283,551 B1 * 10/2007 Algie .................... 370/442
2004/0076166 A1 * 4/2004 Patenaude ............... 370/401

OTHER PUBLICATIONS

Insler, Ron, "Voice Trunking Format over MPLS Implementation Agreement", MPLS Forum Technical Committee, Jan. 2003, pp. 1-11.*

* cited by examiner

*Primary Examiner*—Wing Chan
*Assistant Examiner*—Michael J Moore

(57) ABSTRACT

In a packet communication system, separate ports of a customer interface exchange Ethernet packets with the customer to provide multiple different services. The customer interface exchanges these Ethernet packets with a network interface over a TDM link. The network interface exchanges the Ethernet packets with a network router. The network router interworks between the Ethernet packets and Multi-Protocol Label Switching (MPLS) tunnels. The customer interface, the network interface, and the network router provide Quality-of-Service (QoS) management for the services on a per service basis.

20 Claims, 2 Drawing Sheets

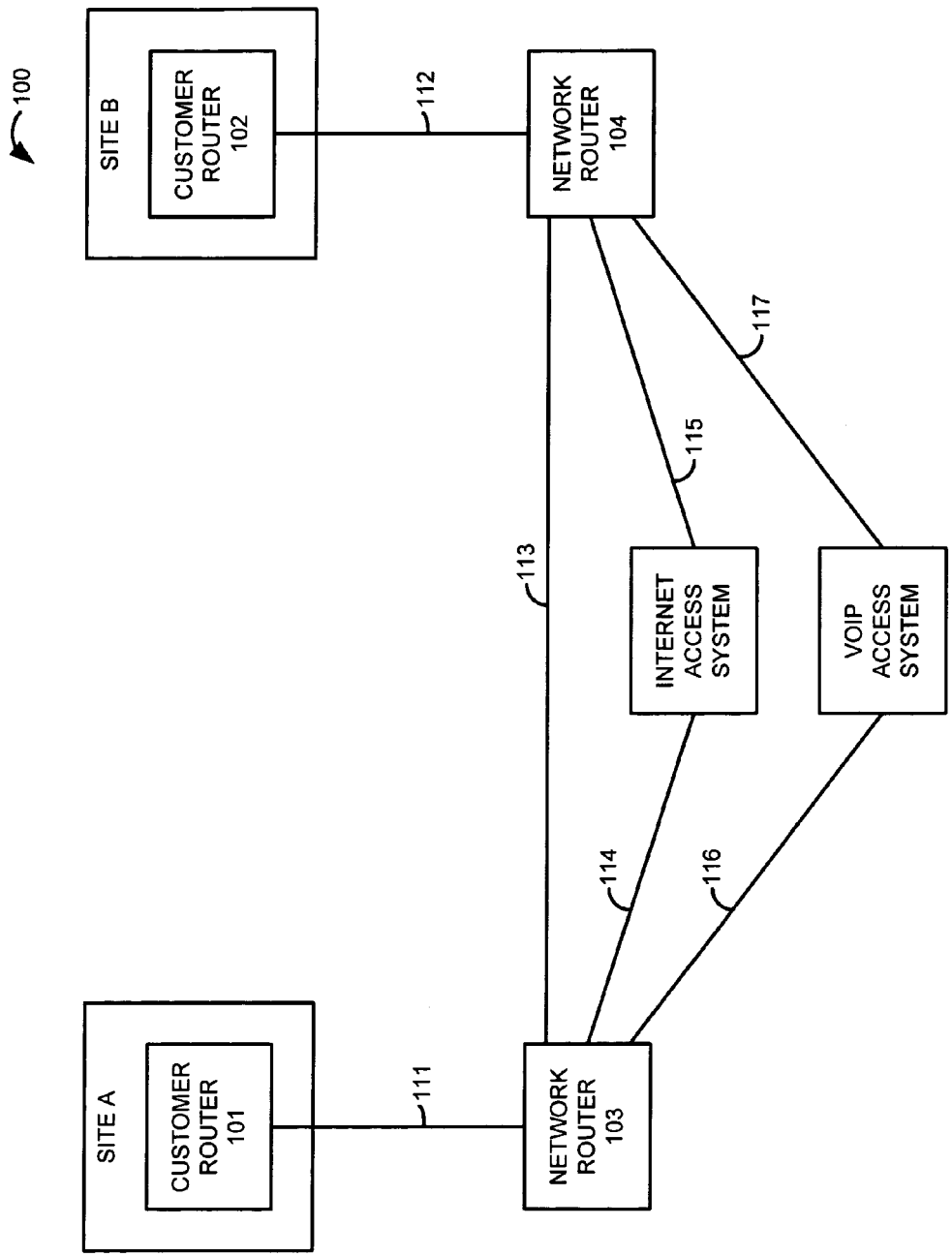
FIG. 1 — PRIOR ART

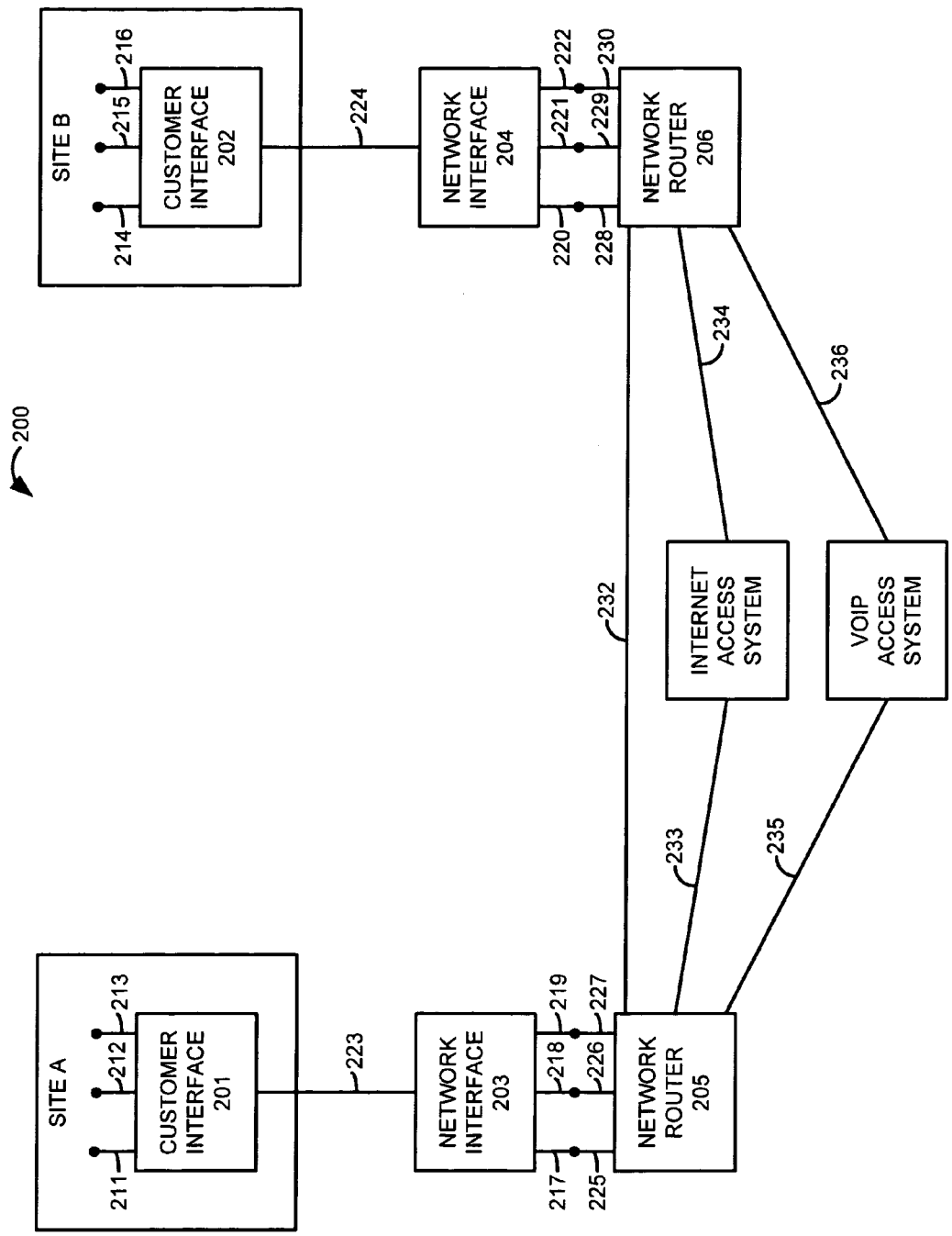

QUALITY MANAGEMENT FOR A PACKET COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to managing the quality of a packet communication system that provides multiple services using diverse transport protocols.

2. Description of the Prior Art

FIG. 1 illustrates packet communication system 100 in an example of the prior art. Packet communication system 100 includes customer routers 101-102 and network routers 103-104. Customer router 101 is located at site A and is coupled to Time Division Multiplex (TDM) link 111. Customer router 102 is located at site B and is coupled to TDM link 112. Network router 103 is coupled to Multi-Protocol Label Switching (MPLS) tunnels 113, 114, and 116. Network router 104 is coupled to MPLS tunnels 113, 115, and 117.

In operation, customer router 101 exchanges user communications with various systems at site A. Likewise, customer router 102 exchanges user communications with various systems at site B. These user communications provide various services to sites A and B. These services include Virtual Private Network (VPN), Internet access, and Voice Over Internet Protocol (VOIP). Customer router 101 exchanges Internet Protocol (IP) packets encapsulating the user communications with network router 103 over TDM link 111. Customer router 102 exchanges IP packets encapsulating the user communications with network router 104 over TDM link 112. Thus, TDM links 111-112 transfer IP packets for multiple services—VPN, VOIP, and Internet access.

For the VPN service, network routers 103-104 encapsulate IP packets from links 111-112 in MPLS wrappers based on addressing in the IP packets. Network routers 103-104 exchange these MPLS wrappers for the VPN service over MPLS tunnel 113 based on the MPLS labels. Network routers 103-104 de-capsulate IP packets from the MPLS wrappers from tunnel 113 based on the MPLS labels and transfer the resulting IP packets over links 111-112. Thus, site A and site B exchange user communications in IP packets over links 111-112 and tunnel 113.

For the Internet access service, network routers 103-104 encapsulate IP packets from links 111-112 in MPLS wrappers based on addressing in the IP packets. Network routers 103-104 exchange these MPLS wrappers with an Internet access system over MPLS tunnels 114-115 based on the MPLS labels. The Internet access system de-capsulates the IP packets from the MPLS wrappers from tunnels 114-115 for exchange with the Internet. The Internet access system also encapsulates IP packets from the Internet in MPLS wrappers for transfer to tunnels 114-115. Network routers 103-104 de-capsulate IP packets from the MPLS wrappers from tunnels 114-115 based on the MPLS labels and transfer the IP packets over links 111-112. Thus, site A and site B exchange user communications in IP packets with the Internet access system over links 111-112 and tunnels 114-115.

For the VOIP service, network routers 103-104 encapsulate IP packets from links 111-112 in MPLS wrappers based on addressing in the IP packets. Network routers 103-104 exchange these MPLS wrappers with a VOIP access system over MPLS tunnels 116-117 based on the MPLS labels. The VOIP access system de-capsulates the IP packets from the MPLS wrappers from tunnels 116-117 for transfer to a VOIP network. The VOIP access system also encapsulates IP packets from the VOIP network in MPLS wrappers for transfer to tunnels 116-117. Network routers 103-104 de-capsulate IP packets from the MPLS wrappers from tunnels 116-117 based on the MPLS labels and transfer the IP packets over links 111-112. Thus, site A and site B exchange user communications in IP packets with the VOIP access system over links 111-112 and tunnels 116-117.

Quality-of-Service (QoS) management for these services is important to the customer. Network routers 103-104 provide QoS management for MPLS tunnels 113-117. This QoS management includes the control over bandwidth, error rates, latency, and jitter on a per tunnel basis. Unfortunately, there are no effective techniques to manage the QoS of the individual services within TDM links 111-112. Thus, all services are treated the same on TDM links 111-112, even if one service should take priority over another service.

The QoS management provided by MPLS can be extended from network routers 103-104 to customer routers 101-102. MPLS extension would require that the customer configure their routers for MPLS QoS management, and then to allow system 100 to manage the configured routers. Unfortunately, MPLS extension may be too complex and expensive for some customers.

Circuit bonding has been developed to provide communication services over concatenated TDM links. Circuit bonding interfaces offer multiple physical Ethernet ports to the customer and the network. The circuit bonding interfaces also provide QoS management on a per port basis. This QoS management includes the control over bandwidth, error rates, latency, and jitter. Circuit bonding systems have not been effectively combined with MPLS systems to provide QoS management at the service level.

SUMMARY OF THE INVENTION

Examples of the invention include packet communication systems and their methods of operation. In some examples of the invention, a packet communication system comprises: a customer interface, a network interface, and a network router. The customer interface is located at a customer site and has physically separate customer interface ports. A first one of the customer interface ports exchanges first Ethernet packets with the customer site for a first service. A second one of the customer interface ports exchanges second Ethernet packets with the customer site for a second service. The customer interface exchanges the first Ethernet packets and the second Ethernet packets with a TDM link. The network interface has physically separate network interface ports. The network interface exchanges the first Ethernet packets and the second Ethernet packets with the TDM link. A first one of the network interface ports exchanges the first Ethernet packets for a first service with a first link. A second one of the network interface ports exchanges the second Ethernet packets for a second service with a second link. The network router exchanges the first Ethernet packets with the first link, and exchanges the second Ethernet packets with the second link. The network router interworks between the first Ethernet packets and a first Multi-Protocol Label Switching (MPLS) tunnel for the first service, and interworks between the second Ethernet packets and a second MPLS tunnel for the second service. The customer interface, the network interface, and the network router provide Quality-of-Service (QoS) management for the first service and the second service on a per service basis.

In some examples of the invention, the QoS management comprises controlling bandwidth.

In some examples of the invention, the QoS management comprises controlling an error rate.

In some examples of the invention, the QoS management comprises controlling latency.

In some examples of the invention, the QoS management comprises controlling jitter.

In some examples of the invention, the QoS management comprises reallocating bandwidth from the first service to the second service.

In some examples of the invention, the QoS management comprises reallocating bandwidth from the first service to the second service based on the first service having a higher priority than the second service.

In some examples of the invention, the first service comprises a Virtual Private Network service.

In some examples of the invention, the first service comprises an Internet access service.

In some examples of the invention, the first service comprises a Voice over Internet protocol service.

BRIEF DESCRIPTION OF THE DRAWINGS

FIG. 1 illustrates a packet communication system in an example of the prior art.

FIG. 2 illustrates a packet communication system in an example of the invention.

DETAILED DESCRIPTION OF THE PREFERRED EMBODIMENT

FIG. 2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates packet communication system 200 in an example of the invention. Communication system 200 includes customer interfaces 201-202, network interfaces 203-204, and network routers 205-206. Customer interface 201 includes Ethernet ports 211-213. Customer interface 202 includes Ethernet ports 214-216. Network interface 203 includes Ethernet ports 217-219. Network interface 204 includes Ethernet ports 220-222. Interfaces 201-204 could be circuit bonding devices. Ports 211-222 are physically separate from one another.

Customer interface 201 and network interface 203 are coupled to TDM link 223. Customer interface 202 and network interface 204 are coupled to TDM link 224. TDM links 223-224 could each comprises a set of individual TDM connections. Ethernet ports 217-219 of network interface 203 are respectively coupled to Ethernet links 225-227. Ethernet ports 220-222 of network interface 204 are respectively coupled to Ethernet links 228-230. Network router 205 is coupled to Ethernet links 225-227. Network router 206 is coupled to Ethernet links 228-230. Network router 205 is coupled to MPLS tunnels 232, 233, and 235. Network router 206 is coupled to MPLS tunnels 232, 234, and 236.

The following table correlates services and their corresponding ports, links, and tunnels for site A.

| SITE A | | | |
|---|---|---|---|
| SERVICE | IF 201 PORT | IF 203 PORT | MPLS TUNNEL |
| VPN | 211 | 217 | 232 |
| INTERNET | 212 | 218 | 233 |
| VOIP | 213 | 219 | 235 |

The following table correlates services and their corresponding ports, links, and tunnels for site B.

| SITE B | | | |
|---|---|---|---|
| SERVICE | IF 202 PORT | IF 204 PORT | MPLS TUNNEL |
| VPN | 214 | 220 | 232 |
| INTERNET | 215 | 221 | 234 |
| VOIP | 216 | 222 | 236 |

In operation, customer interface 201 exchanges user communications with various systems at site A over Ethernet ports 211-213. Likewise, customer interface 202 exchanges user communications with various systems at site B over Ethernet ports 214-216. These user communications provide various services to sites A and B. These services include Virtual Private Network (VPN), Internet access, and Voice Over Internet Protocol (VOIP). As noted in the above tables, the different services are assigned to different Ethernet ports on customer interfaces 201-202. Thus, the services are physically separated from one another by using different physical Ethernet ports for each service.

Customer interface 201 exchanges Ethernet packets encapsulating the user communications with network interface 203 over TDM link 223. Customer interface 202 exchanges Ethernet packets encapsulating the user communications with network router 204 over TDM link 224. Thus, TDM links 223-224 transfer Ethernet packets for multiple services—VPN, VOIP, and Internet access. Network interface 203 exchanges the Ethernet packets with network router 205 over Ethernet ports 217-219 and respective Ethernet links 225-227. Network interface 204 exchanges the Ethernet packets with network router 206 over Ethernet ports 220-222 and respective Ethernet links 228-230. As noted in the above tables, the different services are assigned to different Ethernet ports on network interfaces 203-204. Thus, the services are physically separated from one another by using different physical Ethernet ports for each service.

For the VPN service, network routers 205-206 interwork between the Ethernet packets from Ethernet links 225 and 228 and MPLS wrappers for tunnel 232 based on the addressing in the Ethernet packets (or based on the fact that the packets arrive on links 225 and 228 that are assigned to VPN). Network routers 205-206 exchange these MPLS wrappers for the VPN service over MPLS tunnel 232 based on the MPLS labels. Network routers 205-206 interwork between the MPLS wrappers from tunnel 232 and Ethernet packets based on the MPLS labels and transfer the Ethernet packets over links 225 and 228. Thus, site A and site B exchange user communications over links 223, 224, 225, 228, and tunnel 232.

For the Internet access service, network routers 205-206 interwork between Ethernet packets from links 226 and 229 and MPLS wrappers for tunnels 233-234 based on the addressing in the Ethernet packets (or based on the fact that the packets arrive on links 226 and 229 that are assigned to Internet access). Network routers 205-206 exchange these MPLS wrappers with an Internet access system over MPLS tunnels 233-234 based on the MPLS labels. The Internet access system de-capsulates IP packets from the MPLS wrappers from tunnels 233-234 for transfer to the Internet. The Internet access system also encapsulates IP packets from the Internet in MPLS wrappers for transfer to tunnels 233-234. Network routers 205-206 interwork between the MPLS wrappers from tunnels 233-234 and Ethernet packets based on the MPLS labels and transfer the Ethernet packets over links 226 and 229. Thus, site A and site B exchange user communications with the Internet access system over links 223, 224, 226, 229, and tunnels 233-234.

For the VOIP access service, network routers 205-206 interwork between Ethernet packets from links 227 and 230 and MPLS wrappers based on the addressing in the Ethernet packets (or based on the fact that the packets arrive on links 227 and 230 that are assigned to VOIP access). Network routers 205-206 exchange these MPLS wrappers with a VOIP access system over MPLS tunnels 235-236 based on the MPLS labels. The VOIP access system de-capsulates IP packets from the MPLS wrappers from tunnels 235-236 for exchange with a VOIP network. The VOIP access system also encapsulates IP packets from the VOIP network in MPLS wrappers for transfer to tunnels 235-236. Network routers 205-206 interwork between the MPLS wrappers from tunnels 235-236 to Ethernet packets based on the MPLS labels and transfer the Ethernet packets over links 227 and 230. Thus, site A and site B exchange user communications with the VOIP access system over links 223, 224, 227, 230, and tunnels 235-236.

Quality-of-Service (QoS) management for these services is important to the customer. This QoS management includes the control over bandwidth, error rates, latency, and jitter. Network routers 205-206 provide this QoS management on a per tunnel basis over tunnels 232-236. Since different services are assigned to different tunnels, network routers 205-206 effectively manage QoS on a per service basis. Interfaces 201-204 provide this QoS management on a per port basis over TDM links 223-224. Since different services are assigned to different ports, interfaces 201-204 effectively manage QoS on a per service basis. Thus, packet communication system 200 manages QoS on a per service basis.

Since QoS is managed on a per service and per port basis, faults may be quickly isolated to the port experiencing the fault. QoS may also be managed at individual OSI layers 1, 2, and 3 on a per port and per service basis.

In some examples, the various services may be prioritized, so that resources are allocated form a lower priority service to a higher priority service if necessary. For example, consider that the VOIP service has a higher priority than the Internet access service. If bandwidth difficulties are experienced on link 223, then interfaces 201 and 203 would reallocate bandwidth on link 223 from the lower priority Internet access service to the higher priority VOIP service. Likewise, if router 205 experiences capacity problems, router 205 may reallocate router capacity from the lower priority Internet access service to the higher priority VOIP service.

In some examples of the invention, tunnels other than MPLS could be used. For example, the tunnels could utilize Layer 2 Tunneling Protocol Version 3 (L2TPv3).

Advantageously, packet communication system 200 provides QoS on a per service basis. The customer need only physically separate the services by port at the customer interface. Using these separate ports along with Ethernet and MPLS, packet communication system 200 insulates the services from one another to provide a hardened QoS solution for packet communication networks that transfer multiples service using diverse transport protocols.

The invention claimed is:

1. A packet communication system comprising:
a customer interface located at a customer site and having physically separate customer interface ports, wherein a first one of the customer interface ports exchanges first Ethernet packets with the customer site for a first service, wherein a second one of the customer interface ports exchanges second Ethernet packets with the customer site for a second service, and wherein the customer interface exchanges the first Ethernet packets and the second Ethernet packets with a TDM link;
a network interface having physically separate network interface ports, wherein the network interface exchanges the first Ethernet packets and the second Ethernet packets with the TDM link, wherein a first one of the network interface ports exchanges the first Ethernet packets for a first service with a first link, and wherein a second one of the network interface ports exchanges the second Ethernet packets for a second service with a second link;
a network router configured to exchange the first Ethernet packets with the first link, exchange the second Ethernet packets with the second link, interwork between the first Ethernet packets and a first Multi-Protocol Label Switching (MPLS) tunnel for the first service, and interwork between the second Ethernet packets and a second MPLS tunnel for the second service; and
wherein the customer interface, the network interface, and the network router provide Quality-of-Service (QoS) management for the first service and the second service on a per service basis.

2. The packet communication system of claim 1 wherein the QoS management comprises controlling bandwidth.

3. The packet communication system of claim 1 wherein the QoS management comprises controlling an error rate.

4. The packet communication system of claim 1 wherein the QoS management comprises controlling latency.

5. The packet communication system of claim 1 wherein the QoS management comprises controlling jitter.

6. The packet communication system of claim 1 wherein the QoS management comprises reallocating bandwidth from the first service to the second service.

7. The packet communication system of claim 1 wherein the QoS management comprises reallocating bandwidth from the first service to the second service based on the first service having a higher priority than the second service.

8. The packet communication system of claim 1 wherein the first service comprises a Virtual Private Network service.

9. The packet communication system of claim 1 wherein the first service comprises an Internet access service.

10. The packet communication system of claim 1 wherein the first service comprises a Voice over Internet protocol service.

11. A method of operating a packet communication system, the method comprising:

in a customer interface located at a customer site and having physically separate customer interface ports, exchanging first Ethernet packets between the customer site and a first one of the customer interface ports for a first service, exchanging second Ethernet packets between the customer site and a second one of the customer interface ports for a second service, and exchanging the first Ethernet packets and the second Ethernet packets between the customer interface and a TDM link;

in a network interface having physically separate network interface ports, exchanging the first Ethernet packets and the second Ethernet packets between the TDM link and the network interface, exchanging the first Ethernet packets for the first service between a first one of the network interface ports and a first link, and exchanging the second Ethernet packets for the second service between a second one of the network interface ports and a second link;

in a network router, exchanging the first Ethernet packets with the first link, exchanging the second Ethernet packets with the second link, interworking between the first Ethernet packets and a first Multi-Protocol Label Switching (MPLS) tunnel for the first service, and interworking between the second Ethernet packets and a second MPLS tunnel for the second service; and in the customer interface, the network interface, and the network router, providing Quality-of-Service (QoS) management for the first service and the second service on a per service basis.

12. The method of claim 11 wherein providing the QoS management comprises controlling bandwidth.

13. The method of claim 11 wherein providing the QoS management comprises controlling an error rate.

14. The method of claim 11 wherein providing the QoS management comprises controlling latency.

15. The method of claim 11 wherein providing the QoS management comprises controlling jitter.

16. The method of claim 11 wherein the providing QoS management comprises reallocating bandwidth from the first service to the second service.

17. The method of claim 11 wherein providing the QoS management comprises reallocating bandwidth from the first service to the second service based on the first service having a higher priority than the second service.

18. The method of claim 11 wherein the first service comprises a Virtual Private Network service.

19. The method of claim 11 wherein the first service comprises an Internet access service.

20. The method of claim 11 wherein the first service comprises a Voice over Internet protocol service.

* * * * *